(No Model.)  6 Sheets—Sheet 1.
W. C. FLETCHER.
ELECTRICAL TRAIN BRAKE.
No. 520,108. Patented May 22, 1894.
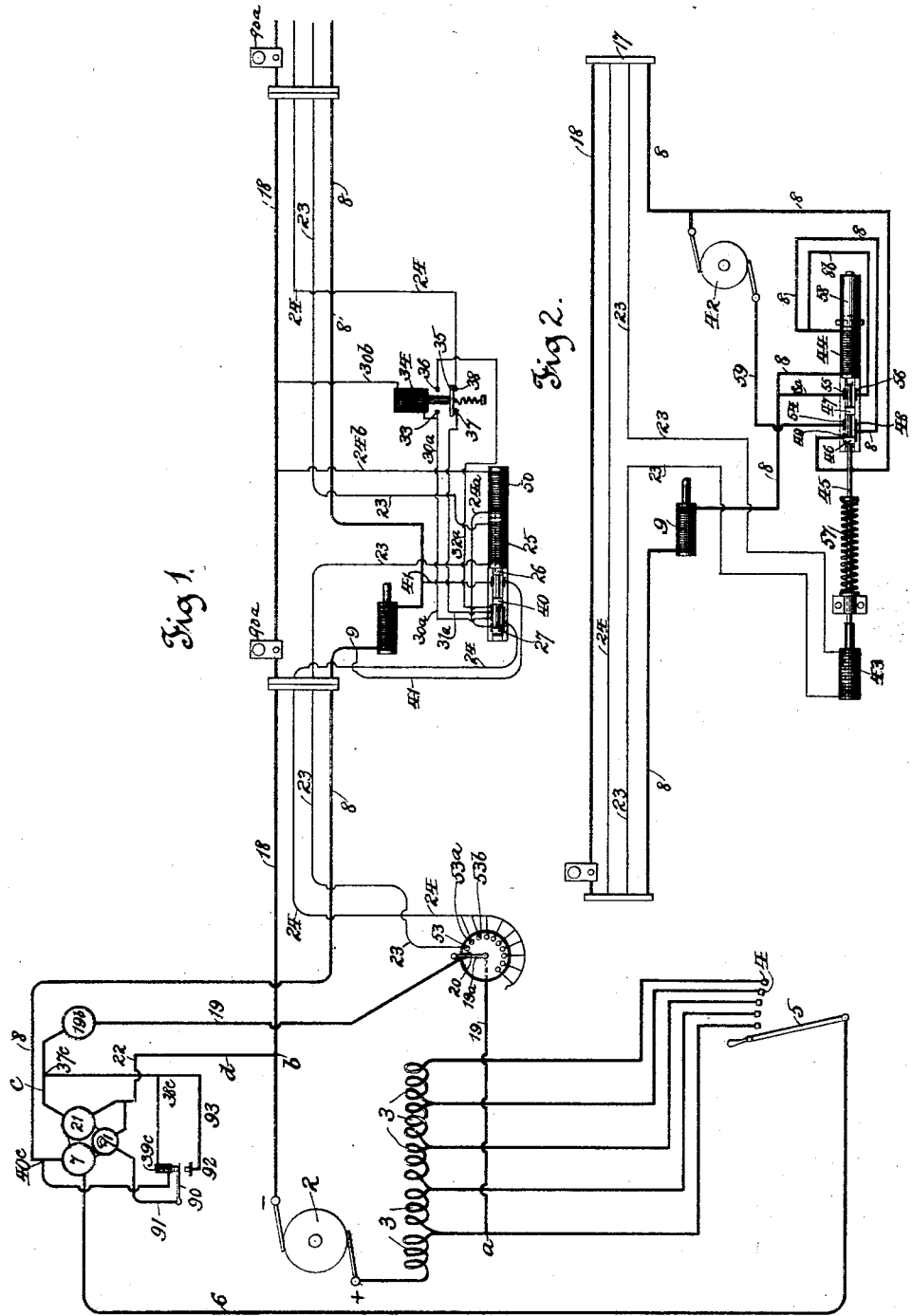
Witnesses
Wm. F. Henning
Wm. M. Rheem
Inventor
W. C. Fletcher
by Raymond & Veeder
Attorneys.

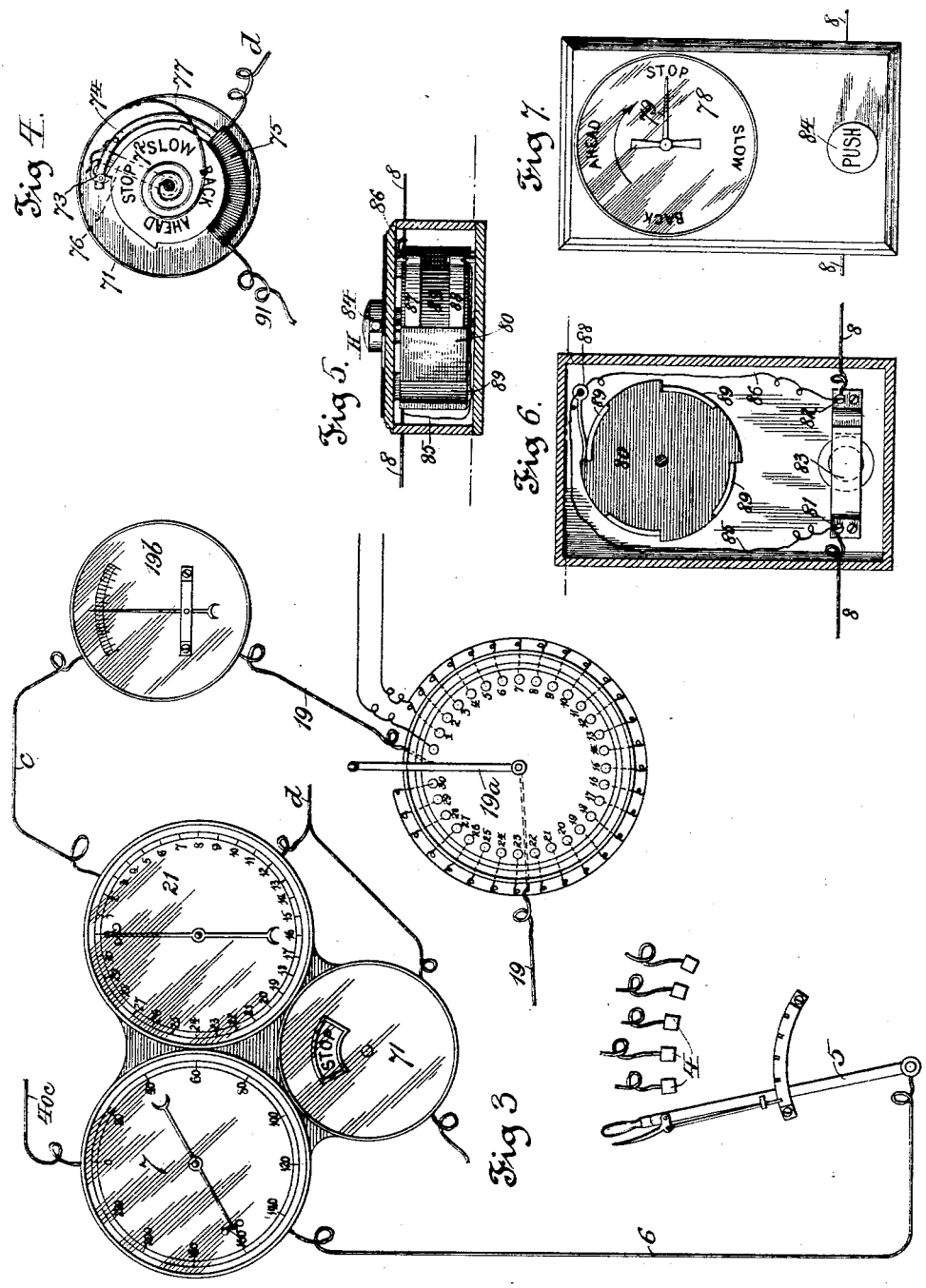

(No Model.)
6 Sheets—Sheet 3.

W. C. FLETCHER.
ELECTRICAL TRAIN BRAKE.

No. 520,108. Patented May 22, 1894.

Witnesses
Wm. F. Henning.
Wm. M. Rheem.

Inventor
W. C. Fletcher
by Raymond & Veeder
Attorneys.

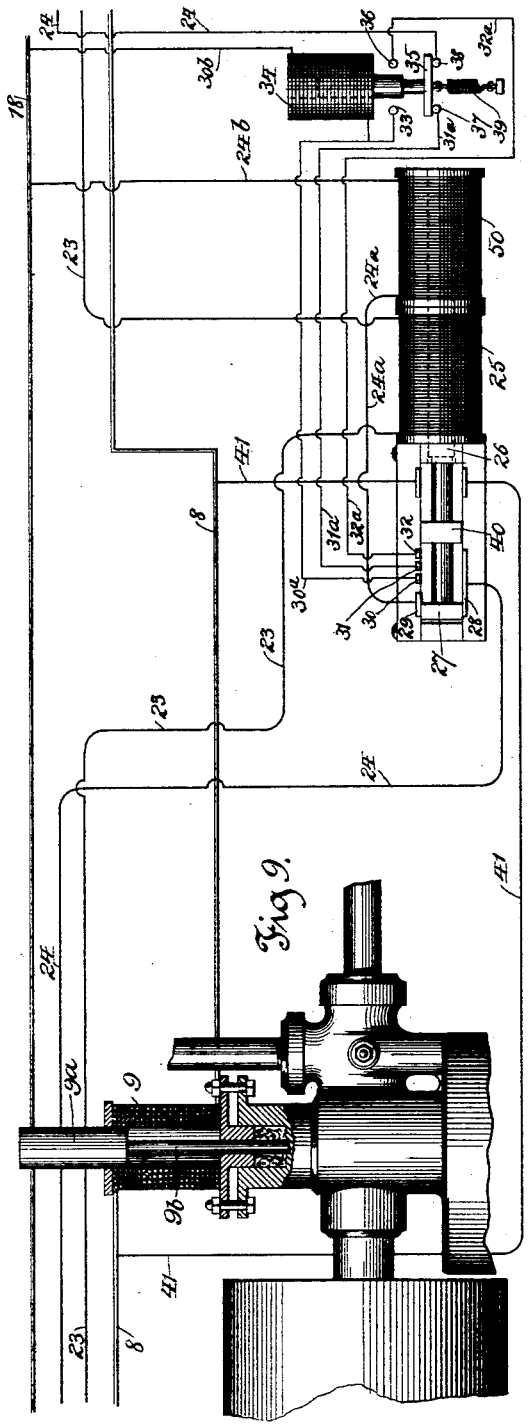

(No Model.) 6 Sheets—Sheet 5.
W. C. FLETCHER.
ELECTRICAL TRAIN BRAKE.
No. 520,108. Patented May 22, 1894.
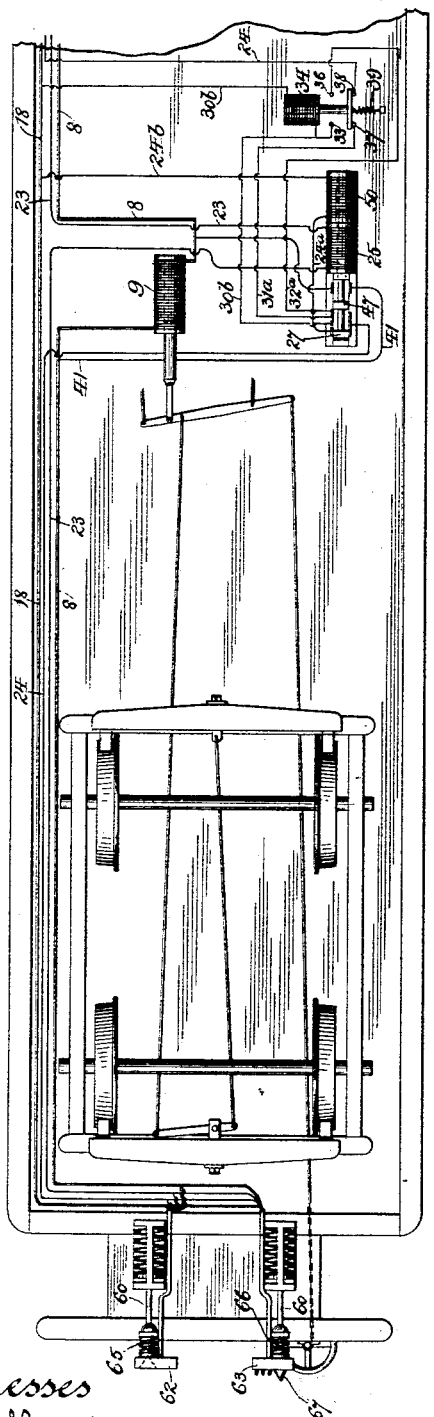
Witnesses
Wm F. Henning.
Wm M. Rheem.
Inventor
W. C. Fletcher
by Raymond & Veeder
Attorneys.
THE NATIONAL LITHOGRAPHING COMPANY,
WASHINGTON, D. C.

(No Model.) 6 Sheets—Sheet 6.
W. C. FLETCHER.
ELECTRICAL TRAIN BRAKE.
No. 520,108. Patented May 22, 1894.
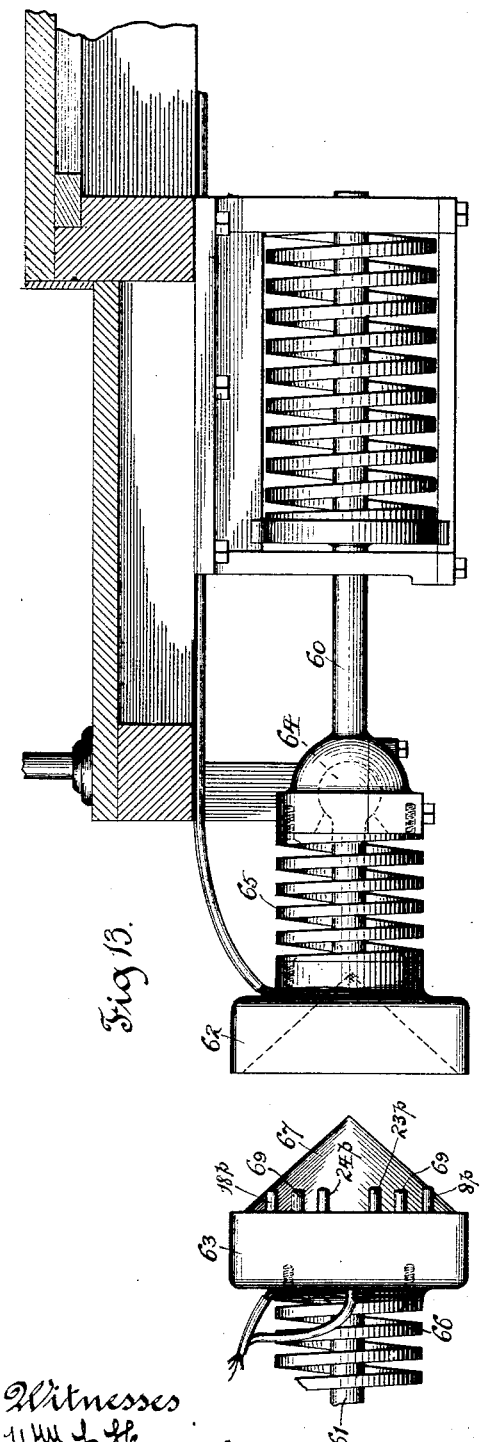
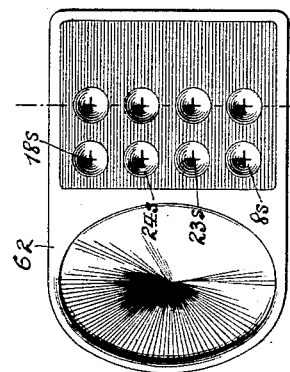
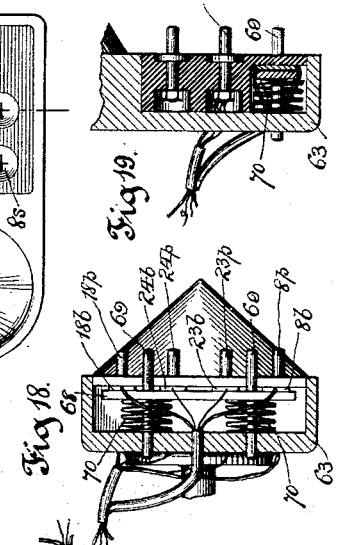
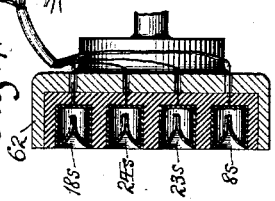
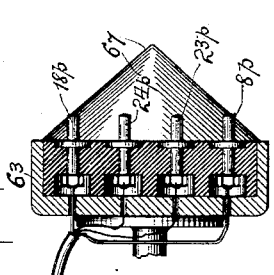
Witnesses
Wm. F. Henning
Wm. M. Rheem
Inventor
W. C. Fletcher
by Raymond & Keeder
Attorneys.

UNITED STATES PATENT OFFICE.

WENDELL C. FLETCHER, OF ST. LOUIS, MISSOURI, ASSIGNOR TO NORMAN P. WILLARD, TRUSTEE, OF CHICAGO, ILLINOIS.

ELECTRICAL TRAIN-BRAKE.

SPECIFICATION forming part of Letters Patent No. 520,108, dated May 22, 1894.

Application filed July 28, 1892. Serial No. 441,439. (No model.)

*To all whom it may concern:*

Be it known that I, WENDELL C. FLETCHER, a citizen of the United States, residing in St. Louis, in the State of Missouri, have invented certain new and useful Improvements in Electrical Train-Brakes, of which the following is a specification, reference being had to the accompanying drawings.

My invention is intended to be operated either by electricity solely or in conjunction with fluid pressure, as the latter is employed in many well known forms of air brakes.

By my present invention I provide means whereby the instantaneous application of the brakes to all the cars of a train may be effected with any desired degree of force. The brakes may also be applied on any desired number of cars counting from the rear of the train, the remaining cars being cut out. The apparatus is so constructed and arranged as to effect the application of the brakes both on the front and rear sections of the train if by accident or design the train should part.

In conjunction with the braking apparatus I employ a signaling apparatus which uses one of the circuits employed in the operation of the brakes, the use of the signaling devices not interfering, however, with the operation of the brakes.

My invention consists of the parts and combinations hereinafter described and claimed.

In the accompanying drawings Figure 1 is a diagrammatic view showing the portions of the apparatus which are mounted upon the locomotive and upon one of the cars of the train. Fig. 2 shows the special construction appropriate for the rear car of the train. Fig. 3 is a view on a larger scale of the appliances in the locomotive cab. Fig. 4 is a view of the signal in the locomotive cab, the cover being removed so as to show the interior mechanism. Figs. 5, 6 and 7 are views in section and elevation respectively of the device employed to operate the signal shown in Fig. 4. Fig. 8 is a side elevation of the locomotive showing the location of the several parts of the braking apparatus which is carried thereby. Figs. 9 and 10 show the arrangement of the braking apparatus as constructed to operate in conjunction with the air brake. Fig. 11 is a view beneath a car showing the general arrangement of the braking devices mounted thereon and also showing the coupling used for connecting the electric circuits running from car to car. Fig. 12 shows a mode of operating the coupler locking pin by means of an electric current. Figs. 13 to 19 inclusive show in detail the electric coupling referred to in connection with Fig. 11.

The main circuit by which the brakes are applied throughout the train, including the connections therewith which are mounted upon the engine, will first be described; and afterward the construction and mode of operation of the selecting devices, by which the brakes may be applied to a part of the train only, and the signaling devices will be described.

In Fig. 1, 2 designates the generator of the electric current, said generator being of any desired construction. The preferred form is that of a dynamo operated by steam from the engine, but a battery may be used if desired.

3 designates the field coils of the dynamo, arrangements being made as herein described, for cutting more or less of the field coils into the circuit so that the strength of the current can be varied. Said arrangments consist of a series of contacts 4 connected to the respective field coils of the magnet and a switch lever 5 adapted to make contact with the contact pieces 4 and connected to the wire 6 leading to the main circuit. The wire 6 leads to an ammeter 7 from which is led a wire 8 forming a part of the main circuit through the train. Said wire 8 is connected to the several brake-actuating magnets 9, which may, either operate directly upon the brake levers, or may be connected, as shown in Fig. 9 to the triple valve mechanism of an air brake so as to control the action of the latter by connections hereinafter described. The current from the wire 8 returns to the generator 2 by means of the wire 18 which forms a return, not only for the current from wire 8 but from the other circuits hereinafter described. Connected to the main circuit formed by the wires 8 and 18 is a second circuit from the dynamo 2 which branches off from the field coils of the dynamo at the point *a* and is led by the wire 19 to a switch lever 19ᵃ. Thence the current continuing by the wire 19 passes through a current indicator 19ᵇ and thence in the course indicated by the figures 37ᶜ, 38ᶜ and 39ᶜ, through the magnet coils at the last named point to a point 40ᶜ where it joins the wire 8. Thence the circuit is through the wire 8 and back to the wire 18 as before. The circuit last described is normally closed as is shown in Fig. 1 and a weak current is constantly circulated through it, said current being maintained at some constant small quantity as indicated by the current indicator 19ᵇ. It serves to test the integrity of the circuit through the train and is employed for signaling purposes but is not strong enough to effect an application of the brakes, that being done through the first circuit described, as will appear hereinafter. Connected in shunt across the poles of the generator from the point $a$ through the wire 19, &c., to the current indicator 19ᵇ and thence from the point 37ᶜ by means of wires $c$, $d$ is a voltmeter 21. The wire $d$ joins the return wire 18 at the point marked $b$. Said voltmeter indicates the potential required to maintain a uniform current through the circuit constituted by the wire 19, switch 19ᵃ, current indicator 19ᵇ, wires $c$ and $d$ and return wire 18 which for brevity, I shall indicate hereinafter as the testing or signaling circuit, and will measure the amount of resistance included within the circuit, and therefore the number of cars in the train, the resistance of each car being substantially a constant quantity. The dial of the voltmeter may be graduated, therefore, to indicate the number of cars in the train.

Application of the brakes to all the cars of the train is effected by shifting the lever 5 so as to make contact with one or the other of the blocks 4. As the lever is moved to the right in Figs. 1 or 3, one coil after another of the field magnets will be included within the circuit and the current will be correspondingly increased. The force with which the brakes are applied will be proportional to the amount of current used and will be indicated by the ammeter 7.

The circuits and the devices by which the brakes upon any number of the forward cars may be cut out or into the circuit will now be described.

Referring to Figs. 1 and 3 it will be observed that the switch 19ᵃ can be moved to any one of a series of contact points 53, 53ᵃ, 53ᵇ, &c. From the contact 53 a wire 23 is led, which wire is attached to an electro magnet 25 under the first car and to a corresponding magnet upon each car of the train, said magnets being connected in series by the wire. The contacts 53ᵃ, 53ᵇ, &c., are joined to a wire 24 which is also led back through the train. Connected in circuit with the wire 24 by means of a short wire 24ᵃ are electro magnets 50 corresponding in number and position to the magnet 25 already described. From each of the electro magnets 50 a short return wire 24ᵇ is led to a common return wire 18. A soft iron core 26 is provided for the electro magnets 25 and 50, the latter having their axes in line with each other so that the core can pass into the coils of either magnet. Said core serves to operate the circuit breaking and closing devices shown on a larger scale in Fig. 9. The wire 31ᵃ leads to a binding post 37 which is normally in electrical connection with the binding post 38 through the bar 35. The second section of the wire 24 is attached to the binding post 38. A spring 39 tends to draw outward the core of the electro magnet 34 and maintains the bar 35 in contact with the posts 37 and 38 when no current passes through the coils of said electromagnet. Attached to the core 26 which carries the sliding block 27, is a second sliding block 40, which, when the core 26 is drawn into the coils of the electro magnet 50, completes an electrical circuit through the wire 41 which is joined to the main lead wire 8 upon each side of the electro magnet 9 operating the brakes. Each car except the last is provided with the devices shown in Fig. 9 and just described. The operation of said devices is as follows: Supposing, first, that the lever 19ᵃ be shifted to the contact 53. A current will then pass through the wire 23 and the magnets 25 throughout the train, thence back to the dynamo by the return wire 18. The wires 8, 23 and 24 are all connected to the return wire 18 through whichever one of the electrical couplings of the cars is at the rear of the train. The construction by which such connection is made is hereinafter described. The effect of the current through the wire 23 is to energize the magnets 25 and to draw the core 26 into such electro magnet, if it is not already in that position. The position of the core 26 will thus be that shown in the drawings and a current will pass through the main wire 8 and through all the electro magnets 9 operating the brakes. The latter will thus be in condition to be applied upon all the cars. On the contrary, when the core 26 is in such position that the block 40 thereon completes the circuit through the contacts on the wires 41, then the electro magnets 9 will be short circuited through wires 41 and the block 40. Supposing, however, that it be desired to cut out the magnets from any number of the front cars of the train, so that the brakes will be applied only to the remaining cars. The switch 19ᵃ when moved to the first contact 53ᵃ which is connected to the wire 24, completes a circuit through said wire 24, 24ᵃ and the electro magnet 50. The core 26 is thus drawn into said electro magnet and the sliding block 27 first makes contact with the block 30. The circuit is thus completed through the wire 24, 30ᵃ, the magnet coil 34 and wire 30ᵇ back to the return wire 18. The bar 35 is raised and makes contact with the posts 33 and 36. The circuit leading to the second section of the wire 24 is thus broken, it being understood that the contact blocks 29, 30, 31 and 32 are but slightly separated from one another and all arranged within the length of, and opposing, the contact block 28, so that the sliding block 27 will successively close the circuits between the contact 28 and each of the other contacts 29, 30, 31 and 32, the width of the sliding block 27 being such that it cannot close more than two of the circuits at a time. Continuing its movement the sliding block 27 makes contact with the blocks 31 and 32. As the block 31 is connected to the wire $31^a$ the opposite end of which is attached to the post 37, no current can pass through this wire until further changes have occurred, as hereinafter described. The contact between the block 32 and the slide 27 completes a circuit through the wire $32^a$, post 36, bar 35, post 33, magnet coils 34 and wire $30^b$ back to the return wire 18. The current which first passed through the magnet coils from the contact block 30, is thus maintained from the contact block 32. The core of the magnet 34 will thus remain energized so long as a current is flowing through the wire 24. The sliding block 40 is shifted at the same time as the block 27 and completing the circuit through the contacts attached to the wire 41, short circuits the magnet 9 and the brake is thus thrown out of action. If now the current be momentarily interrupted by moving the switch handle $19^a$ from the first contact $53^a$, the current through the magnet 34 will be interrupted and the spring 39 will draw down the core until the circuit is re-established through the posts 37 and 38 and their connecting wires. The wire 24 leading to the second core is thus restored to the circuit and the further movement of the handle $19^a$ to the second contact $53^b$ will energize the magnet 50 of the second car and a repetition of the actions just described will take place on the second car, the brake of such car being thrown out of action. In the same manner the brakes on any number of cars may be successively short-circuited.

Fig. 10 shows the same arrangement of circuits, electro magnets and switches applied to operate the stop valve on the air brake train-pipe, the magnet 9 being connected to the stop valve S instead of to the brake as in Fig. 9. The electrical connections are in all respects the same as those shown in Fig. 9 and the operation is the same.

Fig. 11 shows the general arrangement of the brake underneath the car and the manner in which the circuit wires 8, 18, 23 and 24 are led from car to car. The electrical coupling shown at the end of the car will be hereinafter described in detail.

Figure 8:
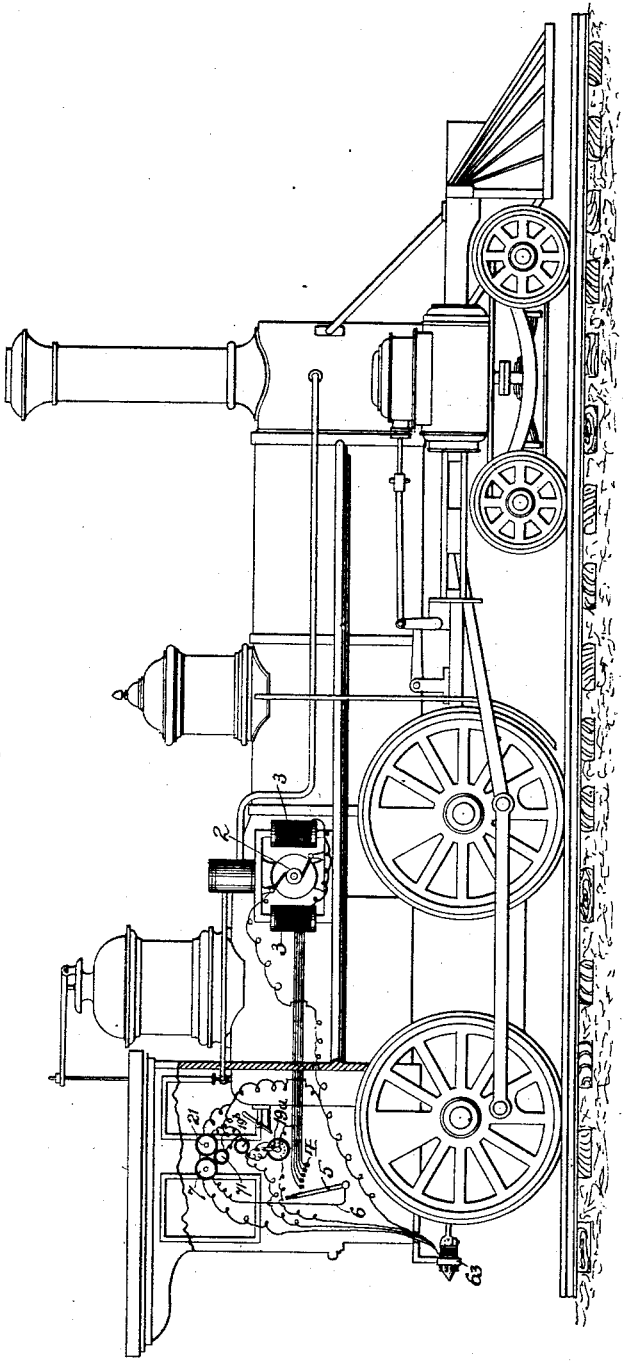

Fig. 2 shows the devices upon the rear car. These consist of a brake magnet 9 and its connections, which are similar to those on the other cars except that upon the rear car or caboose it is not necessary to have the cut out magnets 25, 50 and 34, but it is necessary that a source of electricity should be provided which would apply the brakes on the rear portion of the train in case of an accidental parting of the train. Accordingly, I use a dynamo 42 which may be revolved by the axle of the car and provide for connecting it to the brake circuit in case the current from the locomotive dynamo fails. The devices for accomplishing this purpose, consist of an electro-magnet 43 in circuit with the wire 23, an electro-magnet 44 in circuit with the wire 8, the cores of both said magnets being connected to the rod 45 which carries contact blocks 46 and 47 working between the fixed contacts 48, 49, 54 and between the contacts 55 and 56. A spring 47 surrounds the rod 45 and, when uncounteracted, throws said rod 45 to the right. A dash-pot 58 is also connected to the rod 45 at any convenient point. As shown, it is attached to the core at one end of said rod. When the train is first made up and the brakes are put in working position by shifting the handle $19^a$ to a contact 53 from which is led the wire 23, a current passes through the electro-magnet 43 and acting upon the core of said magnet, draws the rod 45 to the left. The block 46 is thus shifted to the position shown in Fig. 2 and the circuit through the wire 8 is completed through the contacts 48 and 49 and the block 46. The circuit through the wire 8 being thus completed, a current passes through said wire and through the electro-magnet 44 as soon as the handle $19^a$ is shifted back to the contact 20, which is its normal position. The dash pot prevents the spring 57 from acting suddenly when the circuit is momentarily broken, by shifting the handle $19^a$. The current which flows through the wire 8 and magnet 44, tends to keep the core of said magnet within its coils and maintains the rod 45 in the position to which it was shifted by the magnet 43. This position is unaltered unless the train should part; in that case the spring 57 shifts the rod 45 to the right and the block 46 completes the circuit from the block 47 to the block 48. The block 47 is connected by the wire 59 to the dynamo 42. The current can thus pass through the wire 49 contacts 47, 46 and 48 to the wire 8, the brake magnet 9 and thus through the cars which are separated from the rear of the train, back through the return wire 18 to the rear coupling 17 and thence to the other pole of the dynamo. The current from the dynamo, however, is prevented from passing through the coils 44 by means of the short circuit formed by the sliding block 47 and the contacts 55 and 56, which lead by short wires $8^a$ and $8^b$ to the wire 8 on each side of said magnet coils 44.

In order to automatically complete the circuit through the train by the bringing of the cars together, and also in order to automatically effect the cross connection between the cars at the rear end of the last car, I employ the coupling shown in Figs. 13 to 19 inclusive. These couplings are arranged in pairs at the end of the car, each pair being counterparts of the pair on the opposite car, so that the proper coupling can be made, no matter which end of the car is forward. Each coupling is mounted on a spring impelled rod 60, 61, to which the coupling heads 62, 63 are connected by a ball and socket joint indicated by dotted outlines at 64 in Fig. 13. Springs 65, 66 are interposed between the coupling heads and the flanges of the ball and socket joint. A motion in all directions is thus permitted to the coupling heads, the spring, however, having a tendency to keep them projected in a horizontal position. The coupling head 62 has a conical recess in it which fits the cone 67 on the opposite coupling head 63. The coupling 63 has a series of pins $18^p$, $24^p$, $23^p$ and $8^p$ corresponding to the wires 18, 24, 23 and 8 respectively running through the train (vide Figs. 14 and 16). The head 62 has a corresponding series of sockets $18^s$, $24^s$, $23^s$ and $8^s$ into which the pins $18^p$, &c., enter when the couplings are brought together. The cone 67 has a corresponding socket guiding the coupling heads to the proper position. (See Figs. 15 and 17.) The wires 18, 24, &c., are thus connected to the heads on each side of the car, a double connection being thus afforded, so that if one should be imperfect, the other would supply the deficiency. In addition to being connected to the pins $18^p$, &c., the wires 18, 24, 23 and 8 are also connected to blocks $18^b$, $24^b$, $23^b$ and $8^b$ arranged within the coupling head as shown in Fig. 18. A bar 68 extends across these blocks but is kept out of contact therewith when the heads are brought together, by means of the pins 69 projecting from the coupling head 63. When, however, the couplings are separated, the pins 69 are free from the surface of the opposite coupling and the springs 70 underneath the bar 68 forces it against the blocks $18^b$, &c., and a cross connection between the ends of the wires 18, 24, 23 and 8 is thus made. When the cars are coupled this connection is destroyed and there is a cross connection only at the rear end of the last car the currents being thus compelled to pass through all the cars of the train.

In the face views of the couplings Figs. 14 and 15 are shown extra sets of pins and sockets which may be employed to connect up other circuits if desired. For example, the coupling pins and the air cocks as shown in Figs. 10 and 12 may be connected in circuit in the same manner as heretofore described with reference to the brakes, and the circuits controlling said pins and air-cocks will be in all respects duplicates of those described in detail for operating the brakes.

The signaling devices are shown in Figs. 3 to 7 inclusive. They consist essentially of an indicator 71 upon the locomotive, operated by making and breaking an electrical circuit, which circuit in this case consists of the closed testing circuit through the brakes heretofore described; and appliances located upon the cars and within the testing circuit, by which the circuit can be made and broken at will so as to operate the engine indicator. The indicator is shown in detail in Fig. 4. It consists of a toothed wheel 72 bearing the proper signaling marks such as "Stop," "Slow," &c., and which is rotated by means of a pawl 73 operated by a core 74 and an electro-magnet 75. The core and its electro-magnet are curved to the circumference of a circle, and the core is mounted upon an arm 76 pivoted at the center of such circle, which is also the center of the toothed wheel 72. A coiled spring 77 is attached to the axle upon which the arm 76 is mounted and tends to draw the core 74 out of the coils of the magnet 75. In each car is placed a circuit breaker like that shown in Figs. 5, 6 and 7 which is provided with a dial 78 marked to correspond with the wheel of the indicator 71. A pointer 79 is attached to a circuit making and breaking wheel 80, so that the latter may be rotated thereby. The circuit wire 8 is led to binding screws 81, 82 which are connected with each other by a spring 83; thus the circuit is normally completed from one section to another of the wire 8 through the binding screws and the spring, but if the button 84 be pushed the circuit is broken and the current must pass, if at all, through the wires 85, 86 which are likewise connected to the binding screws 81 and 82. The connection between the wires 85 and 86 is through the brushes 87, 88 (Fig. 5) which bear upon the circumference of the wheel 80. The circumference of said wheel consists of alternate sections of conducting surface (which may be the surface of the wheel itself as shown) and of insulating material let into said surface as indicated at 89.

The manner in which the making and breaking of the testing circuit operates the indicator, will be understood by reference to Fig. 1. It will be seen that when the testing circuit is closed by the operation of an ordinary signal push button $90^a$ located along the line 18 as shown in Figs. 1 and 2 the electro magnet at $39^c$ has a current passing through it and attracts its armature 90. Said armature is attached to the wire 91, leading from the indicator 71. So long as the armature is held up, there is no current through the indicator 71. But when the testing circuit is broken, the armature 90 will drop to the contact 92 from which the wire 93 leads back to the point $37^c$ thus completing a circuit through the indicator. The restoring of the testing circuit will cause the armature 90 to be attracted and the circuit through the indicator 71 to be broken. The electro magnet of said indicator is thus alternately put into and out of action, thus causing the armature to be vibrated so as to shift the indicating wheel 72.

I claim—

1. The combination of a generator of electricity; a circuit controlling the brakes; a switch on each car adapted to short-circuit the brake on said car, and a circuit which operates electro magnets connected to said switches to cut out said brakes successively, substantially as described.

2. The combination of a generator of electricity; a circuit controlling the brakes; a switch 27 on each car adapted to short-circuit the brakes on said car; an electro magnet 50 operating said switch; an electric conducting wire 24 extending from car to car, including said magnets and circuit through the wire $24^a$, a return wire $24^b$ leading from said magnet coils to a common return wire 18; means adapted to break the connection of wires 24 and $24^a$ operated in conjunction with said short circuit and switch; a second electro magnet also operated in conjunction with said short circuiting switch and adapted to break connection between the several sections of the wire 24 when a current is passed through its coils; all combined substantially as described, whereby the brakes of the several cars are short circuited in succession by the alternate making and breaking the circuit to the said wire 24.

3. The combination of a generator of electricity, a circuit controlling the brakes; a switch on each car adapted to short-circuit the brake operating magnet on said car, a circuit operating the electro magnets connected to said switches to cut out said brakes successively and a third circuit operating other electro magnets connected to said switch to cut said brakes into the circuit simultaneously, substantially as described.

4. The combination of a generator of electricity, a brake operating circuit connected thereto, means for opening and closing said circuit, and a second circuit connected to said generator and brake circuit normally closed, means adapted to secure a weak current constantly through said second circuit and a voltmeter connected with said second circuit, substantially as described.

5. The combination of a generator of electricity, a brake operating circuit connected thereto, means for opening and closing said circuit, and a second circuit connected to said generator and brake circuit normally closed, and a current indicator and a volt meter connected with said second circuit, substantially as described.

6. The combination of a generator of electricity, a brake operating circuit connected thereto, means for opening and closing said circuit and for varying the strength of the current, a second circuit connected to said generator and brake circuit normally closed and a current regulator and volt meter connected with said second circuit, substantially as described.

7. The combination of a series-wound dynamo, a brake operating circuit connected thereto, a switch adapted to open and close said circuit and to vary the strength of the current by varying the number of field coils in the circuit, and a second circuit from said generator to said brake circuit normally closed and provided with means adapted to secure a weak current constantly therein and a voltmeter connected with said second circuit, substantially as described.

8. The combination with electric circuit wires extending through a train of cars, of an electric coupling between the cars comprising coupling heads supported on universal joints and impelled by springs; cones guiding said heads into apposition, and corresponding pins and sockets on the opposed faces of the heads connected to the conducting wires, substantially as described.

9. The combination with electric circuit wires extending through a train of cars, of an electric coupling between the cars comprising spring impelled opposing heads, pins and sockets making the connection between the conducting wires, contact blocks in one head to which said wires are also connected, a conducting bar impelled by spring pressure to make contact with said blocks, and pins projecting from the head and impelled by said bar, whereby the latter is kept out of contact with said blocks when the coupling heads are together, substantially as and for the purpose described.

10. The combination of a generator of electricity on a locomotive, a circuit adapted to operate the brakes extending through the train and connected to said generator, a generator on the rear car, a switch controlling the circuit from the last named generator and operated by an electro magnet in circuit with the first named generator, said switch being adapted to close the circuit from the second generator on the breaking of the circuit from the first named generator, substantially as described.

WENDELL C. FLETCHER.

Witnesses:
ARTHUR L. THOMPSON,
JOHN H. CANNDER.